US005684839A

United States Patent [19]

Smith et al.

[11] Patent Number: 5,684,839

[45] Date of Patent: Nov. 4, 1997

[54] APPARATUS FOR ADJUSTING SAMPLE POINTS BASED UPON MEASURED INTERSYMBOL INTERFERENCE

[75] Inventors: Michael D. Smith, Flower Mound; Michael R. Williamson, Dallas, both of Tex.

[73] Assignee: Dallas Semiconductor Corporation, Dallas, Tex.

[21] Appl. No.: 536,906

[22] Filed: Sep. 29, 1995

[51] Int. Cl.$^6$ .................................. H04L 1/00; H04L 7/00

[52] U.S. Cl. ............................ 375/348; 375/355; 375/368

[58] Field of Search ..................................... 375/348, 355, 375/368, 346, 354; 455/296; 340/825.14, 825.2; 348/536, 537; 327/141

[56] References Cited

U.S. PATENT DOCUMENTS

| | | | |
|---|---|---|---|
| 4,730,343 | 3/1988 | Kanemasa et al. | 375/350 |
| 5,430,771 | 7/1995 | Fix et al. | 375/354 |

*Primary Examiner*—Stephen Chin
*Assistant Examiner*—Hai H. Phan
*Attorney, Agent, or Firm*—Jenkens & Gilchrist, P.C.

[57] ABSTRACT

A circuit and method of adjusting a sample point for a data stream to account for intersymbol interference is disclosed herein. The system averages the amount of intersymbol interference occurring for a specific data pattern and uses this average value which reflects a phase difference between the leading edges of two pulses to determine at which clock count a sync pulse should issue to sample and read a data value.

4 Claims, 3 Drawing Sheets

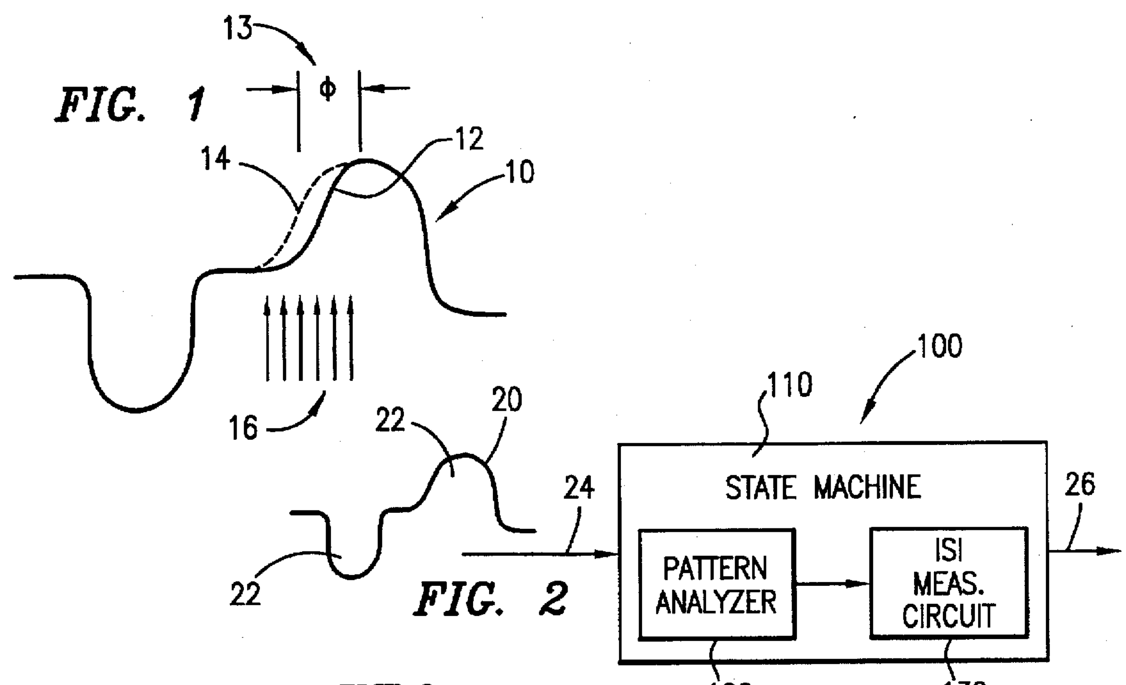
FIG. 1
13
φ
14
12
10
16
20
22
22
24
100
110
STATE MACHINE
PATTERN ANALYZER
ISI MEAS. CIRCUIT
26
120
130
FIG. 2
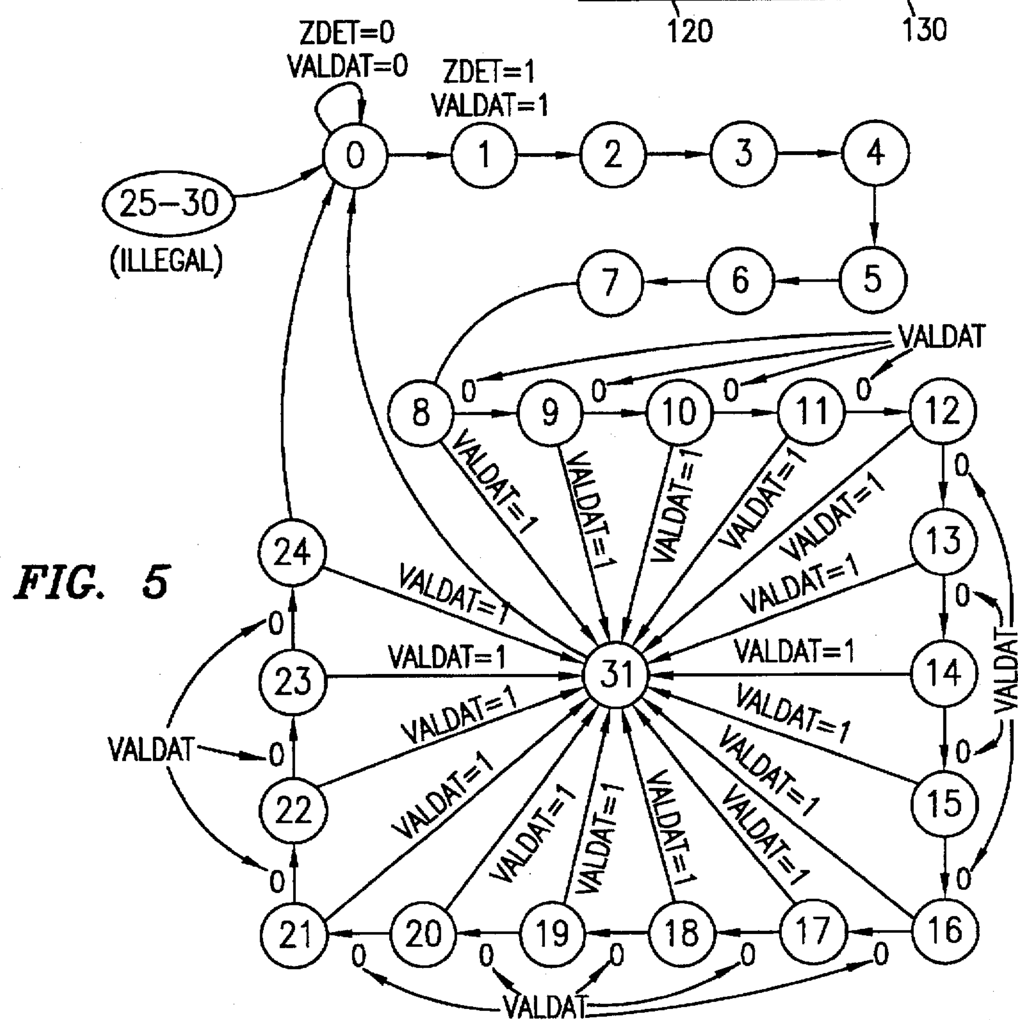
ZDET=0
VALDAT=0
ZDET=1
VALDAT=1
25–30
(ILLEGAL)
VALDAT
VALDAT=1
0
FIG. 5

APPARATUS FOR ADJUSTING SAMPLE POINTS BASED UPON MEASURED INTERSYMBOL INTERFERENCE

PARTIAL WAVER OF COPYRIGHT PROTECTION

A portion of the disclosure of this patent document contains material which is subject to copyright protection. The copyright owner has no objection to the facsimile reproduction by any one of the patent disclosure, as it appears in the United States Patent and Trademark office patent files or records, but otherwise reserves all copyright rights whatsoever.

FIELD OF THE INVENTION

This invention relates to digital transmission line interface circuits, and more particularly, to jitter attenuator and data reconstruction circuits used in communications.

CROSS-REFERENCE TO RELATED APPLICATIONS

This application is related to the following U.S. Patent Applications:

| Ser. No. | TITLE | INVENTOR(S) |
|---|---|---|
| 08/536,897 | Tunable Tone Control Circuit and a-Device and Method for Tuning the RC Constants | Whiteside |
| 08/537,214 | Differential Cross Coupled Peak Detector | Whiteside |
| 08/536,895 | Amplifier with Pole/ Zero Compensation | Whiteside |
| 08/536,023 | Oversampled State Machine for Jitter Tolerant Pulse Detection | Smith et al. |
| 08/536,875 | Ones Density Monitor | Smith |

All of the related applications are filed on even date herewith, are assigned to the assignee of the present invention, and are hereby incorporated herein in their entirety by this reference thereto.

BACKGROUND OF THE INVENTION

Communications over digital lines and other media often use communication protocols that require synchronously formatted data transmission. However, even synchronously transmitted digital data over lines experience oscillating timing shifts during the transmission. Such timing shifts, known as jitter, can result in data lags which in length, can be anywhere from a fraction of a pulse to several pulse periods. Because of these delays, any attempt to read data at the expected or "synchronized" arrival time may result in errors. Accordingly, different approaches have been followed to determine the arrival of a block of data.

One approach has been to utilize digital phase lock loop (PLL) methods to synchronize the data sampling or reading with the data arrival. However, one drawback of utilizing phase lock loop methods is that the PLL circuits are complex and, in an integrated circuit, can consume an undesirable amount of power and circuit space. PLL circuits are generally constructed with feedback loops which can become unstable. PLL systems also increase the device cost. Accordingly, a simpler system which costs less and utilizes less circuitry is desirable.

Another approach has been to utilize traditional L.C. tanks. However, LC tanks are known to introduce jitter and exhibit poor stability over temperature and time.

The T1 transmission standard uses an "alternate-mark-inversion" (AMI) format. The AMI format consists of "0" bits being represented by the absence of a pulse while "1" bits are represented by pulses of alternating polarity. The time average signal voltage of T1 data transmissions, therefore, is zero volts. Additionally, the T1 standard frequency for data transmission is 1.544 Megabits per second. Because a T1 line carries twenty four channels plus one framing bit, each channel transmits at a rate of 64 kilobits per second. Additionally, T1 transmission is based on twisted pair wiring, with separate pairs being used for the transmit and receive sides of the T1 line. T1 lines also require a repeater circuit at least every 6,000 feet to regenerate the signals which are attenuated and phase distorted.

One known problem of digital transmissions at such frequencies is that line inductance and line capacitance cause significant pulse distortion and attenuation. Because a pulse is essentially a signal having a large multitude of varying frequency components, the line inductance and capacitance distort the component signals by phase shifting and attenuating the frequency components in differing amounts. The overall result is to "smear" the original pulse received at the input end of the cable to produce an attenuated signal having ripple waves superimposed thereon. Accordingly, the phases of these signals must be realigned and the attenuation must be compensated to approximately reconstruct the initial pulse.

After a pulse is reconstructed, another problem is to determine that a pulse has arrived so that the optimal sample point of the pulses of a digital stream may be determined. In a PLL system, the timing of the pulses are known because of the synchronized characteristics of phase lock loop. However, as discussed before, it would be advantageous to utilize a circuit simpler than a PLL. One such simpler circuit or approach is a state machine sampling circuit. If a state machine is used, a line must be periodically sampled to determine the presence of the first pulse of a data stream. If pulses were received in an ideal shape without jitter, then the sample rate could be no faster than the actual pulse rate. However, because of pulse distortion and jitter, it is desirable to sample a digital stream for data reading purposes at or near the middle of the pulse. However, to sample in the middle of a pulse, the presence of a pulse must be detected immediately after arrival of the leading edge of the pulse. Thus, if the timing of a pulse is not known exactly, the amount of time after arrival of a leading edge can be minimized by increasing the sample rate of a transmission line for the presence of a pulse.

Another problem, however, is that consecutive pulses tend to interfere with each creating what is known as intersymbol interference (ISI). ISI occurs when pulses are smeared so close to each other that the a first pulse affects the timing of a leading edge of a second pulse to form at the proper point in time. In other words, the leading edge of a second pulse is phase shifted because of the influence of a preceding pulse. By way of example, before a leading edge of a second pulse can form, the signal waveform must have completed the trailing edge of the first pulse because of the alternate mark inversion format which requires pulses to alternate in polarity. Additionally, because of the pulse "smearing" which was discussed earlier, the transition from one wave form to another is not as clean as is desirable. Accordingly, the voltage potentials of adjacent pulses affect and overlap some with the voltage potential of adjacent and subsequent pulses and phase shifts are introduced.

Thus, the designer must compensate for ISI by adjusting or tuning the sample point according to the amount of ISI being experienced by the pulses in the transmission line data stream.

"ISI" is known to be a function of the cable parameters including length, temperature, gauge, moisture on outer surface, etc. If ISI distortion exists for a data stream, the optimum sample point for the pulses of the data stream changes according to certain ISI distortion characteristics.

SUMMARY OF THE INVENTION

A circuit and method for adjusting the sample point of a reconstructed pulse stream in a T1 transmission line is disclosed herein. Specifically, a circuit measures the amount of intersymbol interference being experienced between two pulses every time a particular pulse pattern occurs. Then, according to a time average result of such measurements, the circuit adjusts the sample point of a pulse to be within a range of pulses after determination that a pulse is being received.

BRIEF DESCRIPTION OF THE DRAWINGS

For a more complete understanding of the present invention and the objects and advantages thereof, reference may be made to the following descriptions taken in conjunction with the accompanying drawings in which:

FIG. 1 is a curve illustrating intersymbol interference induced leading edge phase shift;

FIG. 2 is a block diagram illustrating one embodiment of the invention;

FIG. 5 is a state diagram illustrating one-one detection; and

DESCRIPTION OF THE PRESENTLY PREFERRED EXEMPLARY EMBODIMENTS

Figure 3:
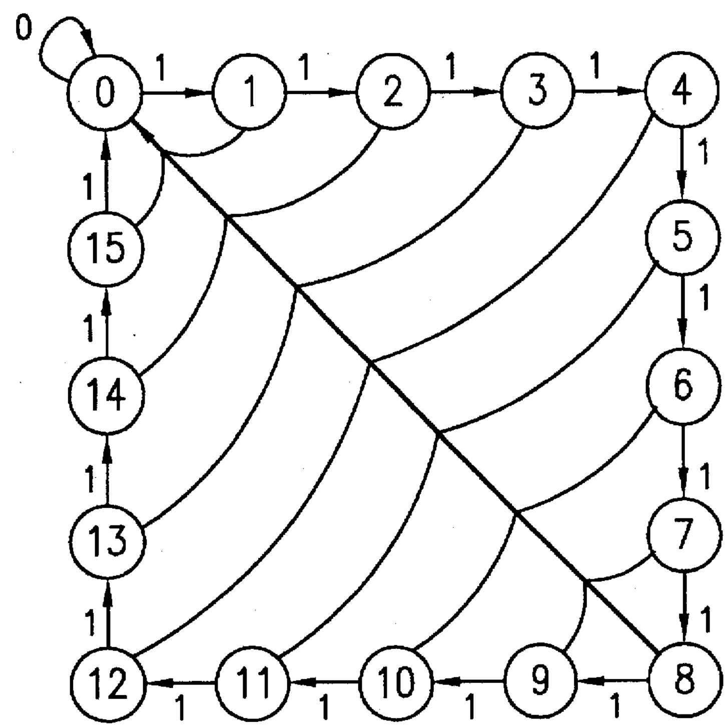
FIG. 3 is a state diagram illustrating count logic.

Referring to FIG. 1, there is shown a curve 10 reflecting a leading edge 12 phase shift 13 due to ISI in a second pulse from an ideal position 14. The arrows 16 represent a plurality of sample points in time to determine the presence of a pulse. The plurality of points illustrated by arrows 16 thus show a range of possible sample points. As may be seen, therefore, if a sample is taken at a point in time represented by one of the arrows on the right hand side of the arrows 16, then it is more likely that an accurate reading of the pulse will occur. On the other hand, if there were no ISI and the leading edge 12 was in its proper location as shown by dashed line 14, then sampling could be done at a point in time represented by an arrow toward the left of the arrows 16. Accordingly, the invention herein involves apparatus and methods for measuring the amount of ISI and manipulating the sample point as reflected by arrows 16 so that the probability of reading a pulse correctly for a stream of pulses is improved.

Referring now to FIG. 2, there is shown a system 100 for receiving a data stream 20 having pulses 22 on line 24 and reading those pulses 22 to output data values corresponding to those pulses on line 26. The system 100 is comprised of a state machine 110, a pattern analyzer 120 and an ISI measuring circuit 130. The state machine 110 is a clock driven state machine which samples an input data stream at a rate higher that the frequency of pulses. In one embodiment, the state machine samples the data stream at a rate of 16 times per pulse period. Other sample rates, though, could be used as well depending upon design choice. For example, sample rates of 8 times and 32 times per pulse period may also be used. Thus, in this embodiment, state machine 110 samples data stream 20 sixteen times per pulse period.

Continuing to refer to FIG. 2, system 100 also comprises pattern analyzer 120 which continuously examines the data stream 20 to determine whether a specific pattern of pulses and zeroes has been received so that ISI may be measured. In this embodiment of the invention, it is desirable to measure the ISI occurring between two consecutive pulses. However, to improve the accuracy of the measured ISI, it is important to ensure that the measured ISI is for two consecutive pulses only. Therefore, the pattern that pattern analyzer 120 searches for is "0" "1" "1". As may be seen, ensuring that a zero precedes the two consecutive ones minimizes ISI from pulses preceding the two pulses for which the interference is being measured.

The pattern analyzer 120 of FIG. 2 is comprised of ordinary logic capable of detecting the logic state of a pulse or zero which is programmed either in hardware or software to produce the logical results specified by the state machines of FIGS. 3, 4 and 5 as will be described below.

Once pattern analyzer 120 determines that the desired pattern has been received, then ISI measurer 130 measures the phase shift 13 of the leading edge 12 of the second of the two pulses as shown in FIG. 1. The measured phase differences are averaged for a sequence of readings to remove any effects from high frequency jitter components. The average that is used to modify sample points is continuously updated and is thereby able to track changes in ISI over time.

The phase measurer 130 of FIG. 2 is comprised of circuitry which is capable of counting the number of clock pulses between a first and a second leading edge. Such circuitry can readily be developed in a variety of ways by one skilled in the art.

Referring now to FIG. 3, there is shown a state machine diagram representing the logic path utilized to determine the presence of a pulse. As may be seen, as soon as a sample reading obtains a potential, or a "1", the state machine transitions from state "0" to state "1". So long as the sampling results continue to read a pulse, the state machine continues to transition from state to state around the state machine in a clockwise manner until a "0" is read. In one embodiment of the invention, this state machine determines that a valid pulse has been received once it reaches state "3". Once the state machine determines that a valid pulse has been received, it sets a signal "valdat" equal to "1" to indicate to other state machines (as will be discussed below) that a valid pulse has been received.

Figure 4:
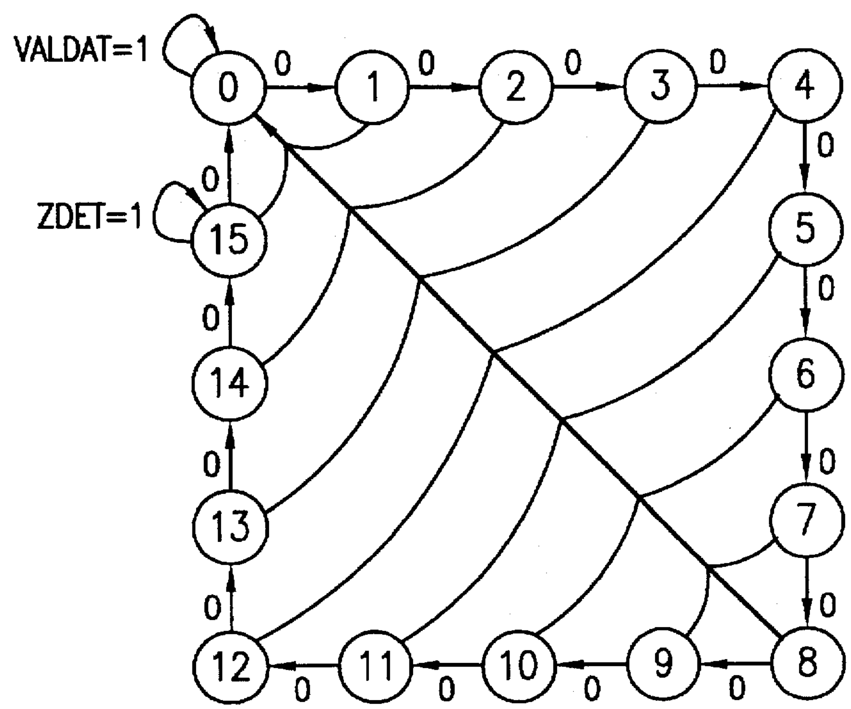
FIG. 4 is a state diagram illustrating zero detection.

Referring now to FIG. 4, there is shown a state machine diagram representing the logic path utilized to determine the presence of a zero. As may be seen, if valdat is equal to "1" and a sample reading obtains a zero, the state machine transitions from state "0" to state "1". So long as the sampling results continue to obtain a zero, the state machine continues to transition from state to state around the state machine in a clockwise manner until a pulse or a "1" is read. In one embodiment of the invention, this state machine determines that a valid zero has been received once it reaches state "15" and sets the signal zdet="".

Referring now to FIG. 5, there is shown a state machine diagram representing the logic path utilized to determine the presence of a "1" "1" or pulse-pulse pattern. As may be seen, this state machine begins to operate and to transition from state "0" as soon as the signal "valdat" and the signal "zdet" are both set equal to "1". Valdat is set equal to "1" whenever the state machine of FIG. 3 determines that a valid pulse has been received as discussed above. The state machine transitions from state "0" to state "8" as clock pulses (which ordinarily drive sampling) are received. Once state "8" is reached the state machine transitions from state to state along the perimeter of the state until it receives another "valdat=1" signal which indicates that a second pulse also has been received. At that point, the sample adjust system measures the delay or phase difference between the leading edges to adjust the sample point, if necessary, in a manner described below.

However, if the valdat=1 signal is not received by the time the state machine reaches state "24", the state machine concludes that a valid 1 has not been received. In such event, the pattern analyzer 120 of FIG. 1 starts the entire process over again so that the state machine, which analyzes data to look for a zero, is reactivated to begin the new search for a "0" "1" "1" pattern.

Once the desired pattern has been received, the ISI measurer 130 then measures the phase difference between the leading edge of the two pulses by counting the number of clock cycles between the leading edges and averages that phase difference with the calculated phase differences which have been averaged for previous time periods. Then, according to the value of the phase difference average, the state machine 110 adjusts its sample point of subsequent data pulses. Specifically, whether the state machine determines whether a signal has a "zero" or a "one" on the third, fourth or fifth clock pulse sample points depends upon the time average of ISI measurements.

The formula for this determination is as follows:

$$\text{Sync} = \text{Algo4}\cdot(\text{Data}=1)[(\text{Last}=1)\cdot(\text{Cnt}=4)+(\text{Last}=0)\cdot(\text{Cnt}=3)] + \text{Algo1}\cdot(\text{Data}=1)[\text{Cnt}=3] + \text{Algo2}\cdot(\text{Data}=1)[(\text{Last}=1)\cdot(\text{Cnt}=3)+(\text{Last}=0)\cdot(\text{Cnt}=4)] + \text{Algo3}\cdot(\text{Data}=1)[(\text{Last}=1)\cdot(\text{Cnt}=3)+(\text{Last}=0)\cdot(\text{Cnt}=5)]$$

In this formula, the logic state of "Last=0" and "Last=1" refers to the data value of the last signal, namely, a zero or a pulse. The value of "Cnt" refers to the state of the state machine, namely states 3, 4 or 5. Finally, the variables "Algo1", "Algo2", "Algo3" and "Algo4" refer to the selected algorithm according to the time average value of ISI discussed previously.

From examining the above formula, the following observation may be made. If the last data value was a "1", then the sync pulse is issued either at Cnt=3 or at Cnt=4 according to which of Algo1, Algo2, Algo3 or Algo4 is set to a "1" If the last data value was "0", then the sync pulse is issued either at Cnt=3 or at Cnt=4 or at Cnt=5 according to which of Algo1, Algo2, Algo3 or Algo4 is set to a "1".

Thus, as may be seen, the "sync" signal which activates sampling of a data stream to read a data stream data value, is set according to whether the last data value was a "0" or a "1" and according to which of the four Algo signals is set to a logic "1".

As has been indicated before, the phase difference between leading edges of two consecutive pulses is measured to determine the amount of instantaneous ISI. The instantaneous amount of ISI is then averaged over a finite specified amount of time to determine the optimum time to sample a transmission line to read a data value. As the time average value reaches certain values, the selected "algo" changes as specified in the table below.

| PHASE (pulse differences) | ALGO |
|---|---|
| 14.50 | 3 |
| 10.25 | 3 |
| 10.00 | 3 |
| 9.75 | 3 |
| 9.50 | 3 |
| 9.25 | 2 |
| 9.00 | 2 |
| 8.75 | 2 |
| 8.50 | 2 |
| 8.25 | 1 |
| 8.00 | 1 |
| 7.75 | 1 |
| 7.50 | 1 |
| 7.25 | 0 |
| 7.00 | 0 |
| 6.75 | 0 |
| 6.50 | 0 |

As may be seen, the left hand column reflects the number of time averaged pulses which are used to reflect the phase difference. As the number of pulses decreases from 10.50 to 6.50, the selected algorithm changes from 3 to 1.

Figure 6:
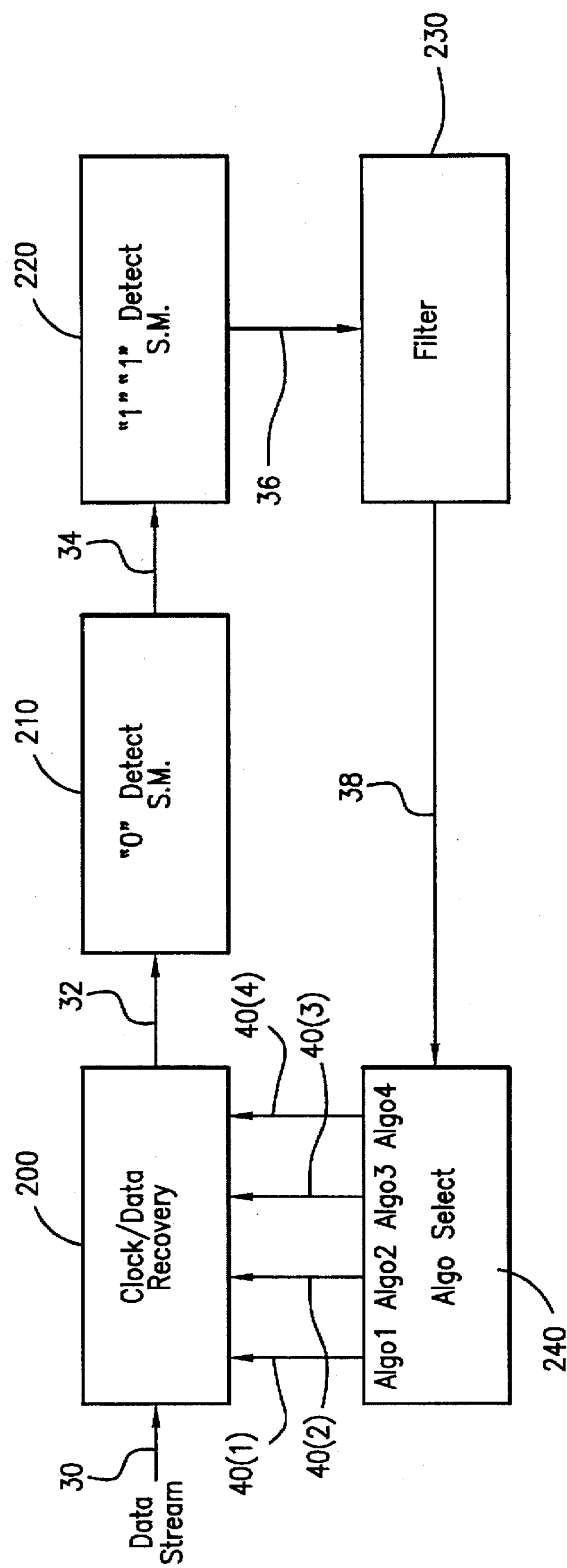
FIG. 6 is a block diagram showing the connections between the clock and count state machines.

Referring now to FIG. 6, a data stream is input on line 30 to clock/data recovery device 200 which samples and reads the data stream from line 30. The output of clock/data recovery 200 is then output over line 32 to "0" detect state machine 210. If "0" detect state machine 210 detects a zero, then it enables over line 34 the "1" "1" detect state machine 220 to search for a "1" "1" pattern. If a "1" "1" pattern is detected, the "1" "1" detect state machine 220 then sends a signal over line 36 to filter 230 to enable it to measure the phase difference, in terms of clock pulses, between the leading edges of the two consecutive "1" "1" pulses. The filter then outputs the average phase over line 38 to algo select 240 which then, as described above, analyzes the data to determine which algorithm is proper. Algo select 240 then sets the appropriate algo signal on lines 40(1) through 40(4) to a logic "1". The filter 230 adds the count of oversampled clocks obtained in the "011" measurement to the average value obtained from previous "011" measurements. The filter time constant is set to remove higher frequency jitter, which can mask the amount of phase shift induced by ISI. The filter output is forwarded to the ALG Select, which then selects an "algorithm" to set to a logic "1", determining the proper sample point of the incoming data stream.

CONCLUSION

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for sampling, comprising:

a state machine connected to a data stream at an input end to produce a data value at an output end, said state machine for sampling said data stream at a sample point;

said state machine further comprising a pattern detector for determining when a prespecified data pattern in said data stream has been received; and said state machine further comprising means for measuring intersymbol interference whenever said pattern detector determines said prespecified data pattern has been received, said means for measuring providing a signal to specify the sample point of said state machine.

2. A system as recited in claim 1, wherein said pattern detector analyzes said data stream for a zero-pulse-pulse pattern.

3. A system as recited in claim 2, wherein said means for measuring measures the phase difference between a leading edge of a first pulse and of a second pulse of said zero-pulse-pulse pattern.

4. A system as recited in claim 3, wherein said means for measuring further averages said measured phase difference and uses said averaged phase difference to determine what signal is provided to specify said sample point of said state machine.

* * * * *

UNITED STATES PATENT AND TRADEMARK OFFICE

CERTIFICATE OF CORRECTION

PATENT NO. : 5,684,839

DATED : Nov. 4, 1997

INVENTOR(S) : Smith et al.

It is certified that error appears in the above-identified patent and that said Letters Patent is hereby corrected as shown below:

Column 4, line 65 — Replace "zdet="".". With --zdet="1".--

Signed and Sealed this

Twenty-third Day of June, 1998

Attest:

BRUCE LEHMAN

Attesting Officer — *Commissioner of Patents and Trademarks*